May 26, 1931. A. E. L. CHORLTON 1,807,384
INTERNAL COMBUSTION ENGINE CONTROL MECHANISM
Filed Feb. 15, 1928 8 Sheets-Sheet 1

WITNESS
E. Lutz

INVENTOR
A.E.L.Chorlton
BY
a. B. Riavis
ATTORNEY

May 26, 1931.  A. E. L. CHORLTON  1,807,384
INTERNAL COMBUSTION ENGINE CONTROL MECHANISM
Filed Feb. 15, 1928   8 Sheets-Sheet 7

WITNESS
E. Lutz

INVENTOR
A.E.L.Chorlton
BY
A. B. Reavis
ATTORNEY

May 26, 1931.  A. E. L. CHORLTON  1,807,384
INTERNAL COMBUSTION ENGINE CONTROL MECHANISM
Filed Feb. 15, 1928  8 Sheets-Sheet 8
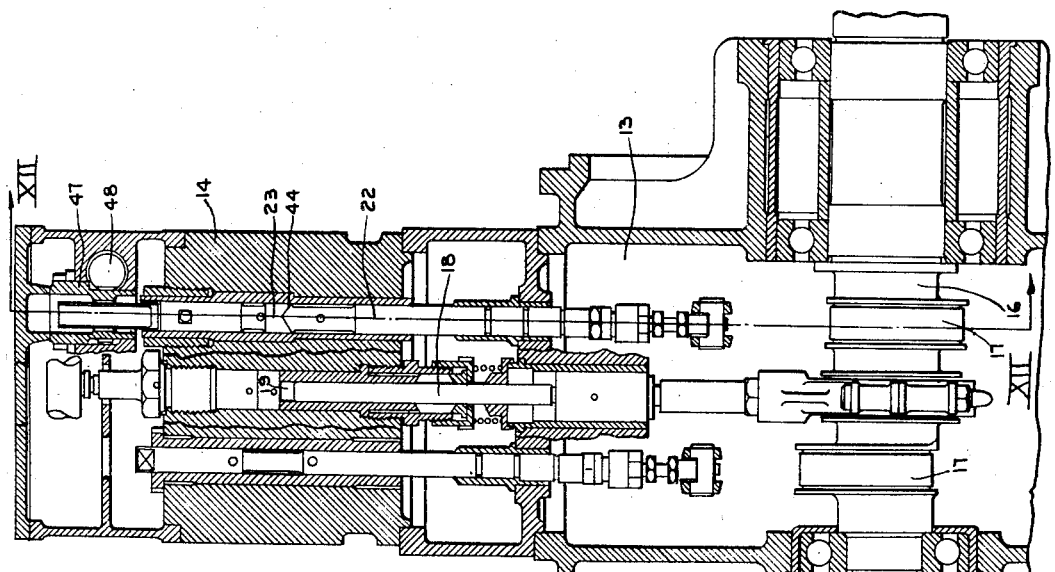
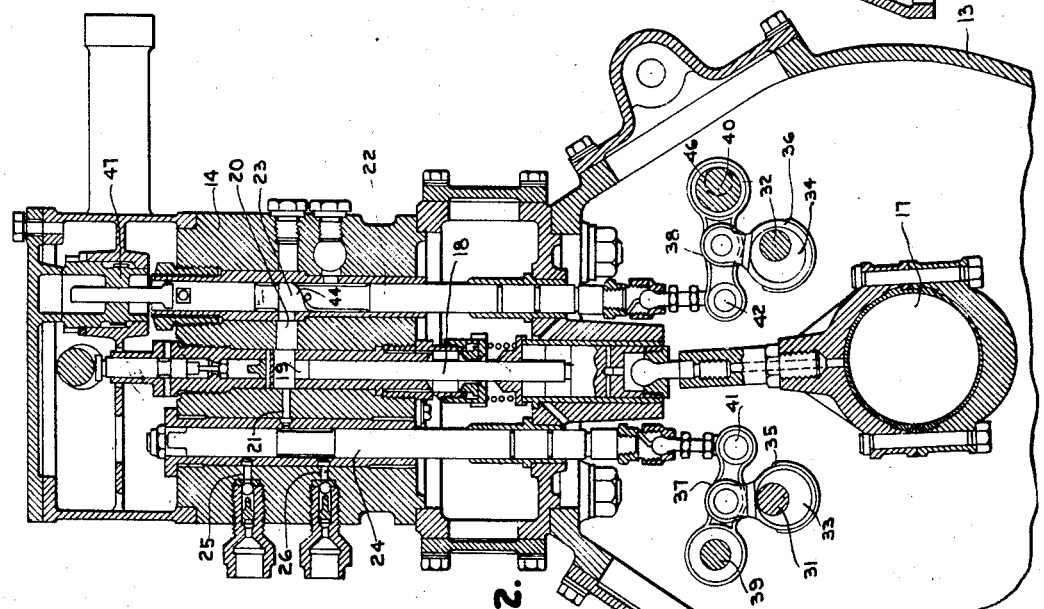
WITNESS
E. Lutz
INVENTOR
A.E.L. Chorlton
BY
a. B. Reaves
ATTORNEY Patented May 26, 1931

1,807,384

UNITED STATES PATENT OFFICE

ALAN ERNEST LEOFRIC CHORLTON, OF LONDON, ENGLAND

INTERNAL COMBUSTION ENGINE CONTROL MECHANISM

Application filed February 15, 1928. Serial No. 254,346.

My invention relates to governor mechanism and it has for an object to provide apparatus of this character which is sensitive, or has good regulation, over a wide speed range A further object of my invention is to provide governor mechanism together with a speed-changer therefor, the governor mechanism being connected to a suitable part to be governed and the speed-changer being also connected to an operating part of the machine to be governed, so that both the speed-changer and the governor mechanism co-operate to secure suitable operation of the machine.

More particularly, my invention has for an object to provide governor mechanism for an internal combustion engine, the governor mechanism being capable of controlling both the timing of fuel injection and the duration of the period of injection. To this end, the injection apparatus is provided with means for varying the duration of injection as well as the timing thereof. For example, I show a fuel injection pump having a pump plunger and a variable cut-off piston valve, the arrangement being such that injection takes place while the piston valve is cut-off position. The duration of injection may be changed by adjusting the piston valve to vary the duration of the period of cut-off, while the timing of injection may be changed by varying the phase relation between the piston valve and the pump plunger. In order that these effects may be produced, I provide governor mechanism which incorporates a speed-responsive part arranged to provide for variation of the period of cut-off and a speed-changer mechanism which determines the speed as well as the timing. In order that the governor mechanism may be sensitive, or have good regulation, over a wide range of speeds, I provide a speed-changer incorporating a spring whose effective scale and effective force may be varied substantially as the square of the speed.

These and other objects are effected by my invention, as will be apparent from the following description and the accompanying drawings forming a part of this application, in which:

Fig. 11 is a longitudinal sectional view of my improved fuel injection apparatus in which the lower portion of the view is taken along the center line of the engine crank shaft extension and the upper or pump block portion is taken along a longitudinal line which is stepped, from left to right, so as to intersect the fuel-distributing valve, the pump plunger and the piston valve, respectively;

Fig. 12 is a transverse sectional view of the pump block and is taken along the line XII—XII of Fig. 11.

Figure 1:
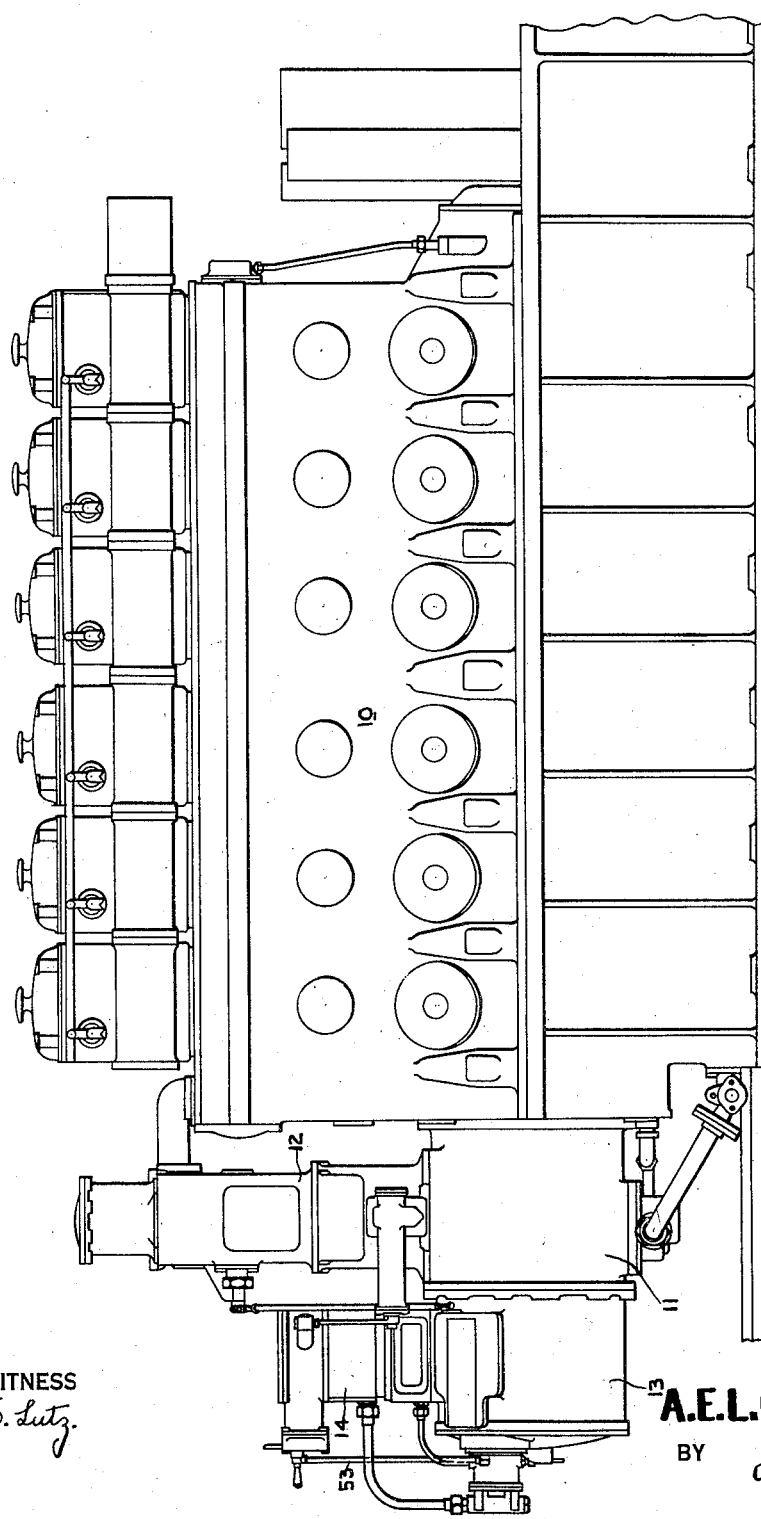
Figure 1 is a side elevation of an internal combustion engine showing my improved governor mechanism applied thereto.

Referring now to the drawings more in detail, I show an internal combustion engine, at 10, to one end of which is secured a governor bracket or housing 11 upon which is mounted the governor housing 12. To the forward end of the bracket 11, there is secured a housing 13 containing operating parts for the fuel injection pump 14 disposed above the housing 13.

Figure 13:
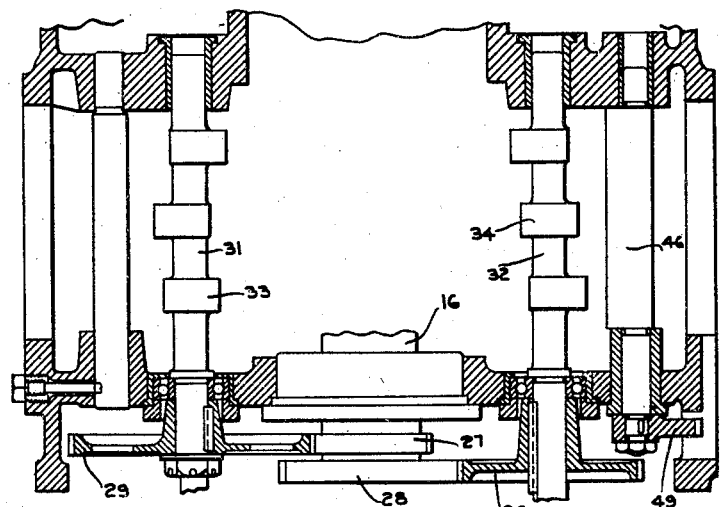
Figure 13 is a sectional view taken along the line XIII—XIII of Figure 10.

In order that the operation of the governor contained within the housing 12 may be better understood, the fuel injection pump, shown more in detail in Figures 11, 12 and 13, will be referred to. The housing 13 contains a crank shaft extension 16 which has eccentric or crank portions 17 for operating the pump plungers 18. The pump plungers 18 are arranged within the cylinders or chambers 19 having inlet and discharge passages 20 and 21, respectively, the inlet passage 20 being interrupted by a piston valve 22 having a variable cut-off piston portion 23. As long as the cut-off portion 23 interrupts communication through the inlet passage 20, during the working stroke of the pump plunger 18, oil is discharged from the discharge passage 21.

As shown in the drawings, a distributor valve 24 is arranged to provide alternate communication of the discharge passage 21 with passages 25 and 26 leading to engine cylinders, the only purpose of the distributing valve being to provide for the supplying of fuel oil to two engine cylinders from a single pump plunger.

The piston valve 22 and the distributing valve 24 are operated in proper phase relation with respect to the pump plunger 18 by suitable connecting mechanism. To this end, referring to Figure 13, the shaft 16 is provided with gears 27 and 28 meshing, respectively, with gears 29 and 30, the latter gears being carried by shafts 31 and 32 having eccentrics 33 and 34 thereon for operating the distributer valve 24 and the piston valve 22, respectively. Straps 35 and 36 encompass the eccentrics 33 and 34, respectively, and they are connected to intermediate points of the levers 37 and 38, the levers having fulcrumed pivots 39 and 40 for the outermost ends thereof and the inner or adjacent ends of the levers being pivotally connected at 41 and 42 to the distributing valve 24 and the piston valve 22.

With the arrangement of apparatus shown, during the initial portion of the working stroke of the pump plunger 18, the inlet passage 20 is open, with the result that fuel oil flows back from the pump chamber 19 through such passage.

During an intermediate portion of the working stroke, the cut-off piston portion 23 of the piston valve 22 interrupts communication through the supply passage 20 and the pump plunger then forces oil through the discharge passage 21 and one of the supply passages 25 or 26, depending upon the position of the distributing valve 24. This action of interrupting the supply passage 20 takes place when the pump plunger 18 is moving most rapidly.

During the final portion of the working stroke of the pump plunger 18, communication is re-established by way of the inlet or supply passage 20, with the result that injection of fuel is suddenly cut off and oil is then caused to flow back through the supply passage.

Not only does the injection period take place during an intermediate portion of the working stroke of the pump when the plunger 18 is moving most rapidly, but the interrupting means, namely the piston valve 22, is also moving most rapidly during its stroke. A very rapid sequence of establishing, interrupting, and re-establishing communication through the supply passage 20, is provided by having the piston valve 22 perform these functions during movement in a single direction. For example, during the initial portion of the working stroke of the plunger 18, the cut-off piston portion 23 would be below the supply passage 20; during the intermediate portion of the working stroke of the plunger 18, the piston portion 23 would be in cut-off position interrupting the passage 20; and during the final portion of the working stroke of the plunger 18, the piston portion 23 would be above the passage 20, thereby re-establishing communication through the latter.

In order that the effective injecting stroke of the pump may be varied, I show the piston valve portion 23 provided with a lower helical face 44 so that the duration of the period of cut-off, and, therefore, of the period of injection, may be varied, this being accomplished by angularly adjusting the piston valve 22.

In order that the timing of injection may be varied, I provide means whereby the phase relation of the piston valve 22 may be changed with respect to the pump plunger 18. To this end, I show the pivot 40 for the lever 38 in the form of an eccentric 46 which may be adjusted in order to change the phase relation of the piston valve 22 with respect to the pump plunger 18 and, therefore, the time at which injection takes place during the working stroke of an engine cylinder.

In order that angular adjustment of the piston valve 22 may take place to vary the duration of injection, I provide a pinion member 47, which is splined or slidably and non-rotatably connected to the upper end of the piston valve 22 (see Figures 11 and 12), this pinion member 47 being carried by the pump housing 14. A rack 48 meshes with the pinion member 47, the rack being moved longitudinally by the governor mechanism, as will be hereinafter pointed out.

Figure 9:
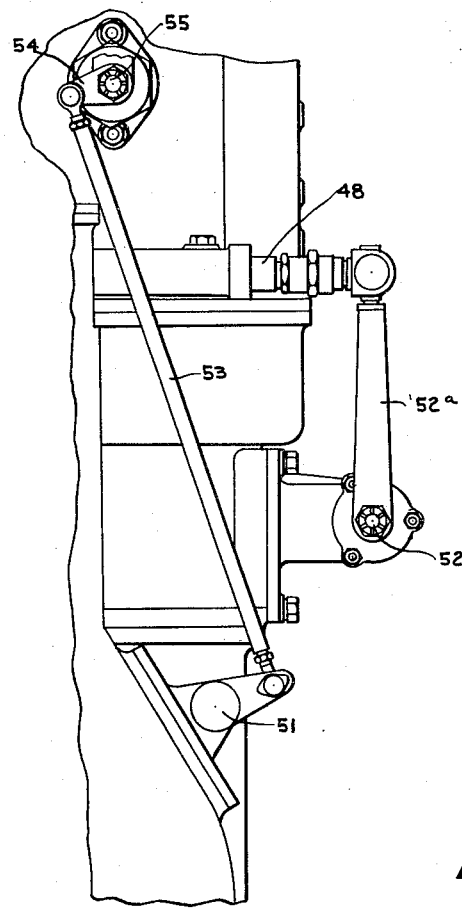
Figure 9 is a detail view showing connecting mechanisms between the governor and the fuel injection apparatus.
Figure 6:
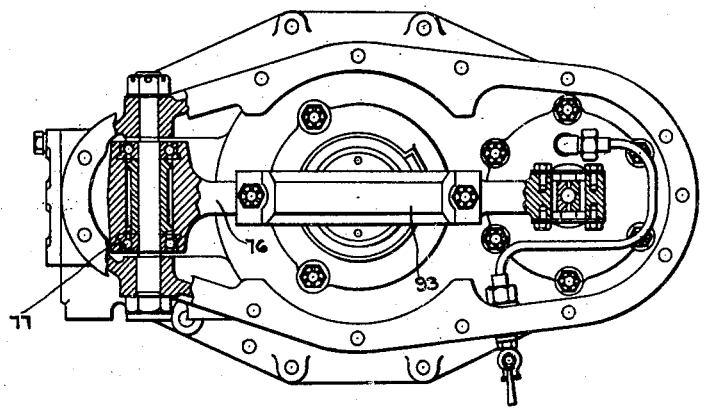
Figure 7:
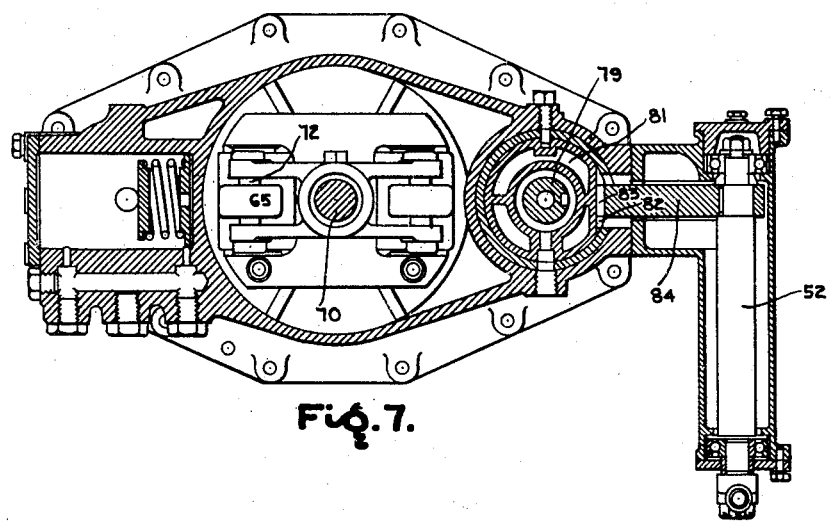
Figure 10:
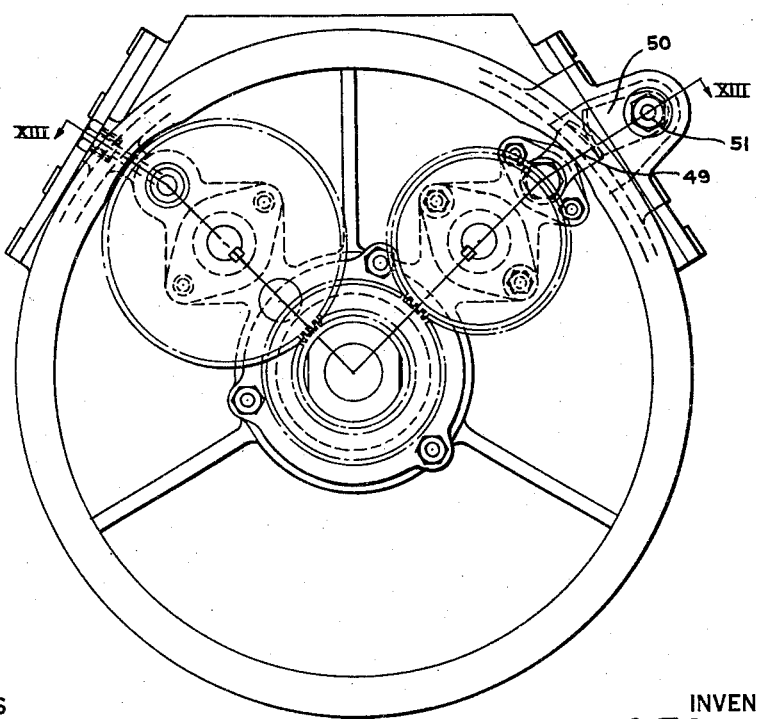
Figure 10 is a detail fragmentary view of the housing for operating parts of the fuel injection apparatus.

The eccentric 46 for varying the phase relation of the piston valve 22 with respect to the pump plunger 18 is connected to a sector 49 (see Figures 10 and 13), which meshes with a sector 50, the latter being connected to the rock shaft 51 (see Figures 9 and 10). The rack 48 and the rock shaft 51 are connected to the governor mechanism in the manner to be described.

The rack 48 for varying the duration of cut-off by the piston valve portion 23 is connected to one end of a crank arm 52a, the latter being connected to the operated shaft 52 of the governor mechanism.

The rock shaft 51 for changing the time of injection is connected, by a link 53, to a crank arm 54 carried by a rock shaft 55, which is operatively connected to the speed changer mechanism of the governor.

Having now referred to the injection device and the connection thereof to the governor so that both the duration and timing of injection may be controlled, the governor mechanism will be described more in detail. As may be seen, from Figures 3 and 4, the governor is of the fly-ball type, the governor consisting essentially of a speed-responsive centrifugal governor mechanism, at 57, and speed changer mechanism, at 58, the governor mechanism, at 57, serving to operate the shaft 52 to secure variation in the duration of injection in accordance with the load and the speed changer mechanism, at 58, being intended for the purpose of securing a fairly wide range of speeds with good regulation, is connected to the rock shaft 55 to secure variation in timing.

Referring first to the governor mechanism, at 57, I show the engine driven shaft 16 provided with a beveled gear 59 which meshes with a beveled pinion 60 carried by the lower end of the rotary governor frame 61, the latter being mounted, by bearings 62 and 63, for rotation within the governor housing structure 64.

Figure 8:
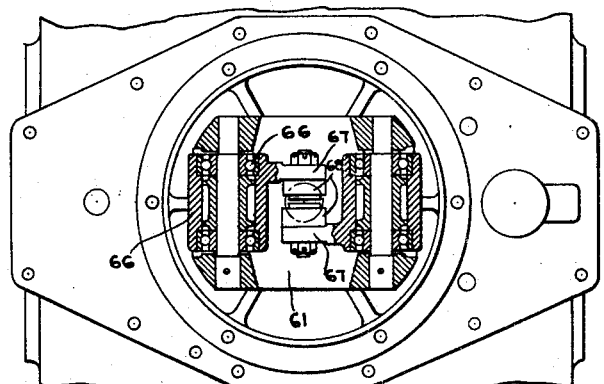

Governor weights 65 are pivotally supported at their lower ends, as indicated at 66, by the rotary frame 61, and such weights are provided with arms 67 which overlap, as may be seen from Figure 8, the arms having secured thereto rollers 68, which contact with the lower end of the governor spindle 70. Inward and outward movement of the governor weight 60 is limited by slots 71 provided in the weights and by pins 72 carried by the rotary frame 61 and arranged within the slots 71.

The spindle 70 is suitably supported by the rotary frame 61 and by a bearing 73 carried by the upper portion of the housing 64. The upper end of the spindle is provided with a thrust ball or member 75 which engages with an intermediate portion of a lever 76 fulcrumed at one end, at 77, and having its other end pivotally connected, at 78, to a pilot valve 79 of a servo-motor device, at 80, for operating the rock shaft 52.

Figure 3:
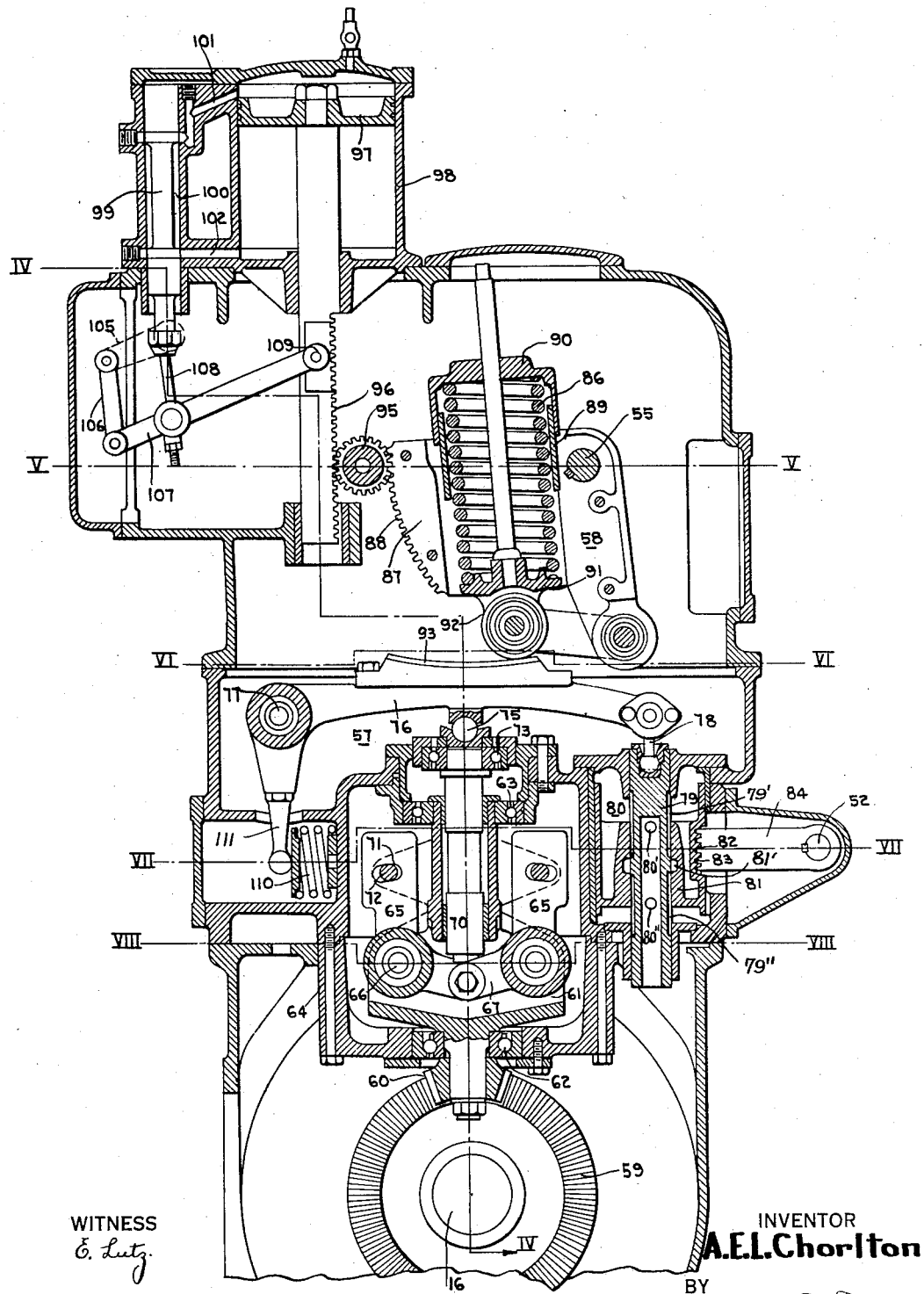
Figure 3 is a sectional view taken along the line III—III of Figure 4, and showing the governor mechanism.
Figure 4:
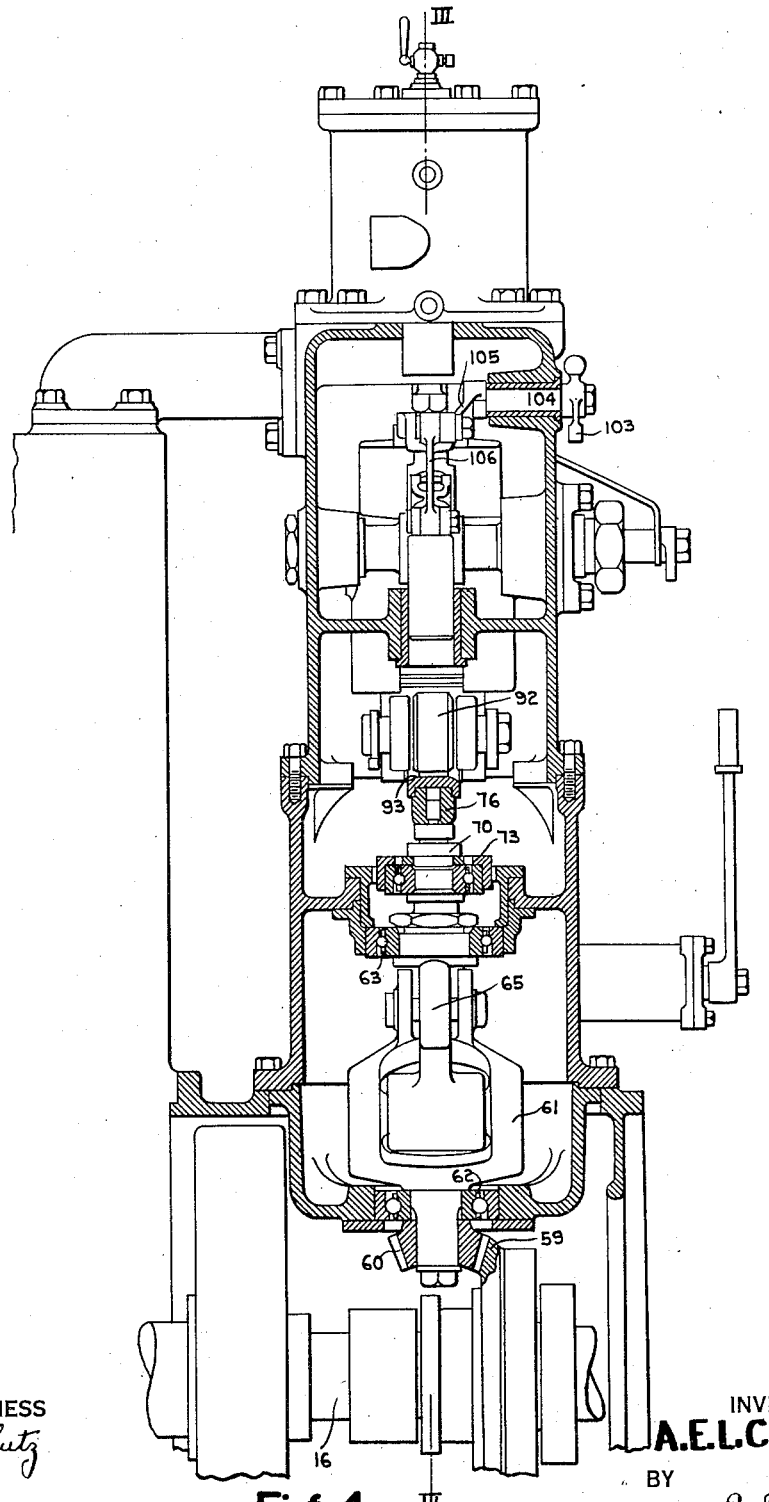
Figure 4 is a sectional view taken along the line IV—IV of Figure 3.
Figure 5:
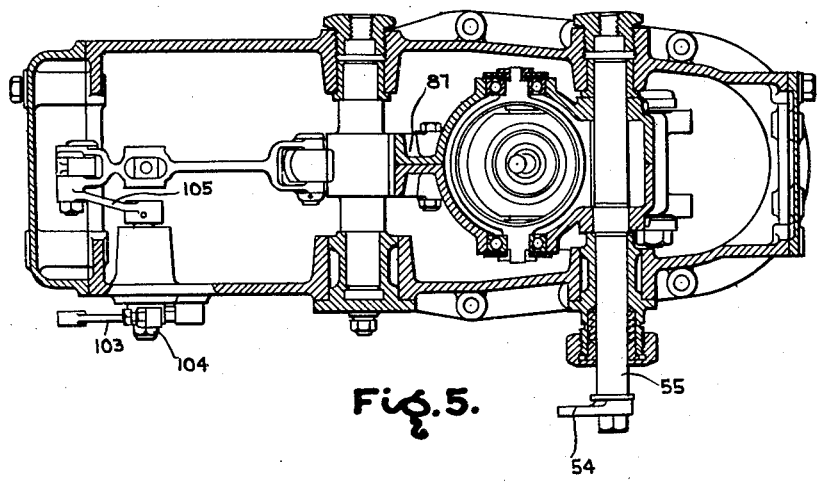
Figures 5, 6, 7 and 8 are sectional views taken along the lines V—V, VI—VI, VII—VII and VIII—VIII, respectively, of Figure 3.

Outward movement of the weights 65 and upward movement of the spindle 70 are resisted by suitable opposed spring means associated with the speed changer mechanism, indicated generally at 58; however, before referring more in detail to the speed changer mechanism, the operation of the lever 76 in controlling the servo-motor, at 80, will be briefly referred to. As shown in Figure 3, the pilot valve 79 is connected to the lever 76 and movements imparted to the pilot valve by such lever result in following-up movements by the operating piston 81. Oil or other motive fluid under pressure is admitted to an annular space 81' provided in the operating piston, which annular space is arranged to communicate, when the pilot valve 79 is axially displaced from the position illustrated, with either the upper longitudinally-extending slots 79' or the lower longitudinally-extending slots 79''. In addition, radially-extending discharge openings 80' and 80'' are provided in the pilot valve. As will be apparent, when the pilot valve 79 is moved in a downward direction, lubricant under pressure passes from the annular space 81' through the slots 79' to the upper end of the cylinder 80 and acts upon the upper face of the piston 81 to move it downwardly until such time as the circular space 81' again registers with the valve face portion of the pilot valve intervening between the upper and lower slots 79' and 79''. As the pilot valve moves downwardly, the opening 80'' is disposed below the end face of the piston 81 and is therefore free to discharge oil from the lower end of the cylinder, 80 into the bore of the pilot valve from which it drains to the bottom of the casing. As will be apparent, upon movement of the pilot valve in an upward direction, the reverse action takes place. The operating piston 81 is provided with intermediate rack teeth 82 which mesh with teeth 83 on the sector member 84 keyed to the shaft 52, the latter being operatively connected, as already pointed out, to the mechanism for changing the duration of injection. It will, therefore, be seen that the duration of the period of injection is directly under the control of the governor mechanism, at 57, the latter operating through a servo-motor or relay to move the rack 48 for changing the duration of injection.

Referring now to the speed changer mechanism, at 58, the latter consists essentially of a spring 86, carried by a sector member 87 keyed to the shaft 55, which has already been referred to as being connected to the means for changing the timing of injection. The sector member is provided with a rack 88 in order that it may be moved angularly by suitable mechanism to be hereinafter described. The sector member is provided with a member 89 which encompasses the spring 86, a cap 90 being threaded to the member 89 and abutting with the upper end of the spring 86. The lower end of the spring 86 abuts a member 91 provided with a roller 92 which rides on the curved track 93 provided at the upper side of the lever 76.

It will be apparent that, if the roller 92 is caused to approach the fulcrum or pivot 77, the spring 86 will offer less resistance to upward movement of the lever 76. Hence, for a given movement of the governor spindle 70, the effective scale of the spring means, referred to such spindle, may vary substantially as the square of the speed. With movement of the roller 92 toward and away from the fulcrum 77 of the lever 76 both the moment arm of the spring 86 and the deflection thereof vary. In other words, the nearer the roller 92 is to the fulcrum 77, the less the effect of the moment arm of the spring on the lever 76 will be. Also, the nearer the roller 92 is to the fulcrum 77, the less the deflection of the spring will be for a given movement of the governor spindle 70. Hence, as both the moment arm and the deflection of the spring are less, the nearer the roller 92 is to the fulcrum 77, the less the effective scale of the spring will be for movement of the spindle 70 a given distance. With the roller 92 at the limit of its position near to the fulcrum 77, the spring device is in a low-speed position, that is, the effective scale of the spring is at a minimum. With the roller 92 at the limit of its position away from the fulcrum 77, the effective scale of the spring 86 will be a maximum and the governor will then be in high-speed adjustment. By providing for movement of the spring in the manner described, the effective scale with respect to a given movement of the spindle 70 is varied approximately as the square of the speed.

In addition to variation of the effective scale of the spring 86, it is desirable also that the spring force shall be varied approximately in accordance with the square of the speed. To this end, the roller 92 is arranged to ride upon a suitably curved track 93 at the top side of the lever 76 and the sector member 87 is so disposed with respect to the shaft 55 that, with movement of the roller 92 along the track 93, the change in initial force of the spring 86 will be in right relation to the effective scale of the spring. From Fig. 3, it will be apparent that the spring force is at a minimum when the roller 92 is at the limit of its position near the fulcrum 77 and that the force of the spring is at a maximum when such roller is at its other limit. Initial setting of the spring 86 may be varied as desired by adjusting the cap 90 with respect to the member 89.

Having now described means for securing variation both in effective force of the spring and in effective scale of the spring approximately as the square of the speed, the means for adjusting the speed changer will now be described. The rack 88 is driven by an intermediate idler 95, which meshes with a rack 96 connected to the operating piston 97 arranged in the cylinder 98.

Movement of the operating piston 97 is secured by adjustment of the pilot valve 99, the latter serving to control communication between a high pressure fluid supply 100 and the passages 101 and 102 leading, respectively, to opposite ends of the cylinder 98. The pilot valve is moved upwardly or downwardly by means of a lever 103 arranged exteriorly of the governor housing 12 and connected to a rock shaft 104, the latter being connected at its inner end, to a crank arm 105 which is connected, by way of a link 106, to the outer end of a floating lever 107. The floating lever is connected, at an intermediate point, to the pilot valve 99 by means of a link 108, and at one end, as indicated at 109, to the rod 96 of the operating piston.

Figure 2:
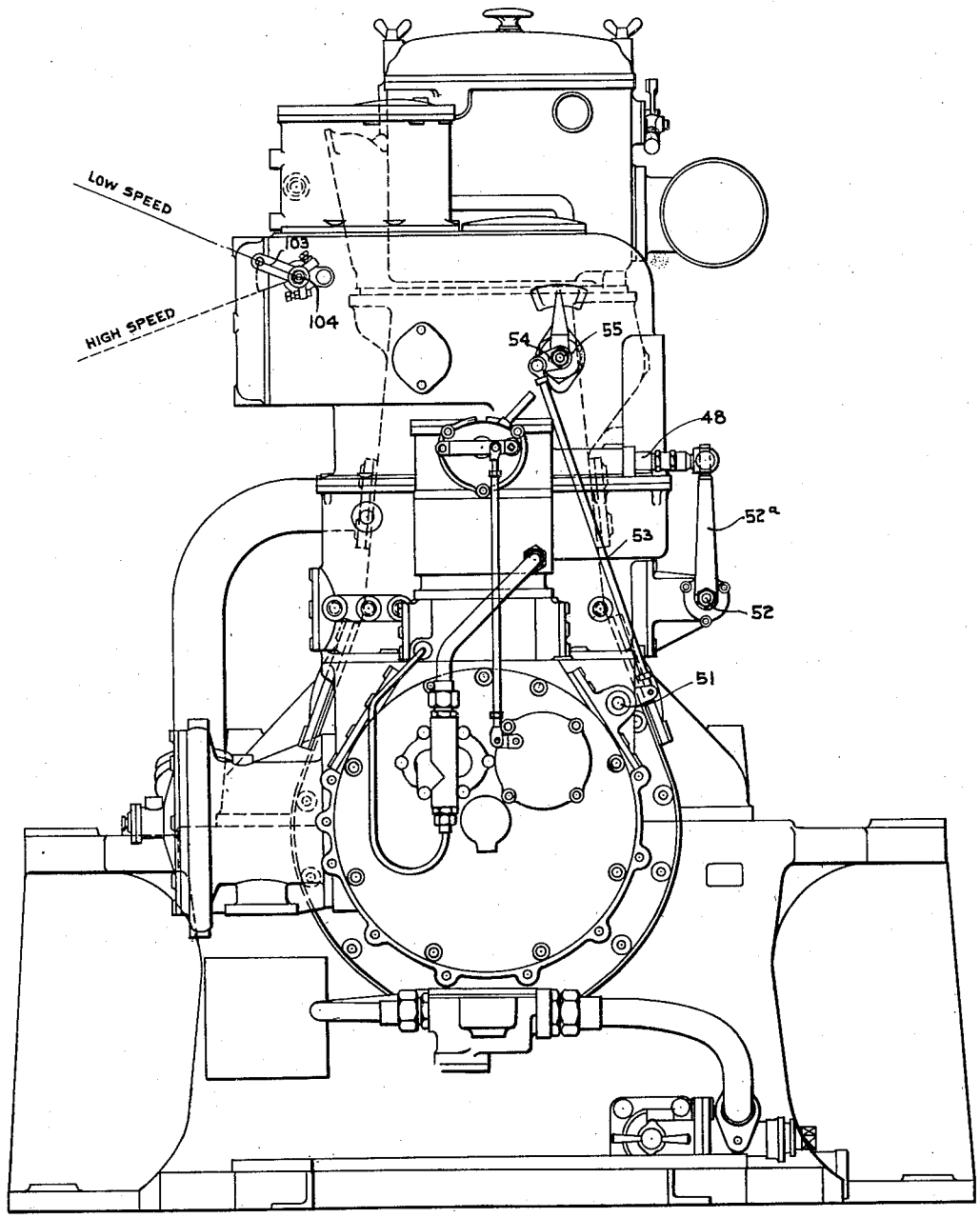
Figure 2 is an end elevation of an internal combustion engine having my improved governor mechanism applied thereto.

With this arrangement, therefore, if the lever is moved, the first effect is to move the pilot valve 99, with the result that the operating piston 97 is moved. Due to the connection of the floating lever 107 with the operating piston rod and with the pilot valve, such movement of the operating piston causes the pilot valve to be brought back to neutral, cut-off position. With the apparatus as shown, and referring to Figure 2, the uppermost position, indicated by solid lines, of the lever 103, is the low-speed position, whereas the lowermost position, indicated by a dotted line, is the high speed position.

As already pointed out, the shaft 55, to which the sector 87 of the speed changer mechanism is keyed, is connected, by a link 53, to the apparatus for varying the timing of the fuel injection device.

Although I have described the spring 86 somewhat in detail so far as the accomplishment of the functions of securing variation in effective spring force and effective spring scale are concerned, nevertheless, a second spring is shown for cooperation with the lever 76, this spring being shown at 110 and being under compression with respect to an arm 111 carried by the lever 76, so that the spring 110 is normally effective in such a direction as to tend to oppose the effect of the centrifugal weights. This spring 110, however, is relatively light, and its effect, so far as the spring force is concerned, is rather small, this spring being primarily intended as a damper to damp out hunting.

From the foregoing, it will be apparent that I have devised a governor mechanism which is effective over a wide range of speeds, that is, my improved governor mechanism has good regulation both at high and at low speeds. To this end, as already pointed out, I provide in conjunction with the governor mechanism, a speed changer which serves to provide an effective spring force and an effective spring scale which vary approximately as the square of the speed. The speed changer mechanism is connected to the fuel injection device so that the position of such mechanism is determinative of the time at which injection shall take place. On the other hand, the duration of injection is determined wholly by operation of the governor mechanism proper, at 57, such governor mechanism responding to give a long period of injection when the load is heavy and a short period when the load is relatively light.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:—

1. The combination with an internal combustion engine provided with a fuel injection device having means for varying the duration of injection and means for varying the timing of injection, of a governor operated by the engine and including centrifugal weights, spring means for opposing the centrifugal effort of the weights, means under control of the weights and of the spring means and connected to the injection duration varying means for controlling the latter in accordance with the load imposed upon the engine, means for varying the effective scale of the spring means so as to obtain various operating speeds of the engine, and means responsive to said speed-varying means for effecting adjustments in the time of fuel injection.

2. The combination with an internal combustion engine and an injection device therefor including a pump having a plunger, inlet and outlet passages for the pump, means for interrupting the inlet passage during the working stroke of the plunger, means for varying the duration of interruption, means for varying the timing of interruption; of a governor operated by the engine and including a pivoted lever, weights arranged to exert their centrifugal effort against the lever, spring means cooperating with the lever to oppose the centrifugal effort of the weights, means for changing the effective scale of the spring means so as to obtain various operating speeds of the engine, means operated by the lever for controlling said interruption varying means, and means operated by the scale changing means for controlling said timing varying means.

3. The combination with an internal combustion engine and an injection device therefor including a pump having a plunger, inlet and outlet passages for the pump, means for interrupting the inlet passage during the working stroke of the plunger, means for varying the duration of interruption, means for varying the timing of interruption with respect to the working stroke of the plunger; of a governor operated by the engine and including a pivoted lever, weights arranged to exert their centrifugal effort against the lever, spring means cooperating with the lever to oppose the centrifugal effort of the weights, means for changing the effective scale of the spring means so as to obtain various operating speeds of the engine, means operated by the lever for controlling said interruption varying means, and means operated by the scale changing means for controlling said timing varying means.

4. The combination with an internal combustion engine having a driven shaft, of a fuel injection device including a pump provided with a plunger, inlet and outlet passages for the pump, a piston valve for establishing, interrupting and re-establishing communication through the inlet passage during each working stroke of the plunger, means for varying the duration of interruption, means operated by the driven shaft for reciprocating the plunger and the valve and including a rock lever for transmitting motion to the valve, and an eccentric fulcrum for the rock lever; a governor operated by the engine and including speed changer mechanism; means operated by the governor and controlling the duration of the period of interruption of communication through the inlet passage; and means operated by the speed changer for determining the position of said eccentric fulcrum.

5. The combination with an internal combustion engine having a fuel pump for periodically supplying fuel to the engine, said fuel pump embodying a cylinder having fuel inlet and outlet means, a plunger reciprocable within the cylinder for developing fuel pressure, valve means cooperating with the fuel inlet means of the pump to control the duration and time of fuel injection, means responsive to angular adjustment of the valve means for varying the duration of the periods of fuel injection, and means for actuating the valve means from the engine and including an angularly adjustable eccentric member for varying the time of fuel injection, of a governor driven by the engine for controlling the speed thereof, means responsive to movement of the governor for angularly adjusting the valve means so as to regulate the duration of the periods of fuel injection, adjustable speed changer mechanism embodied in the governor, and means responsive to adjustment of said speed changer mechanism for angularly adjusting the eccentric member of the valve actuating means, whereby the position of the valve means relative to the fuel pump inlet means is changed so as to alter the time of fuel injection.

6. The combination with an internal combustion engine having a fuel pump for periodically supplying fuel to the engine, said fuel pump embodying a cylinder having fuel inlet and outlet means, a plunger reciprocable within the cylinder for developing fuel pressure, valve means cooperating with the fuel inlet means to control the duration and time of fuel injection, means responsive to angular adjustment of the valve means for varying the duration of the periods of fuel injection, and means for actuating the valve means from the engine and including a lever having an adjustable fulcrum for varying the time of fuel injection, of a governor driven by the engine for controlling the speed thereof, means responsive to movement of the governor for angularly adjusting the valve means so as to regulate the duration of the periods of fuel injection, adjustable speed changer mechanism embodied in the governor, and means responsive to adjustment of said speed changer mechanism for adjusting the fulcrum of the lever embodied in the valve actuating means, whereby the position of the actuating means relative to the fuel pump inlet means is changed so as to alter the time of fuel injection.

In testimony whereof, I have hereunto subscribed my name this nineteenth day of January, 1928.

ALAN ERNEST LEOFRIC CHORLTON.